(12) United States Patent
Higgs

(10) Patent No.: US 10,386,153 B1
(45) Date of Patent: Aug. 20, 2019

(54) SPEAR LAUNCHING ASSEMBLY

(71) Applicant: Clint Higgs, Nassau (BS)

(72) Inventor: Clint Higgs, Nassau (BS)

( * ) Notice: Subject to any disclaimer, the term of this patent is extended or adjusted under 35 U.S.C. 154(b) by 0 days.

(21) Appl. No.: 15/976,508

(22) Filed: May 10, 2018

(51) Int. Cl.
| F41B 7/04 | (2006.01) |
| F41B 3/02 | (2006.01) |
| F42B 6/08 | (2006.01) |
| F41G 1/35 | (2006.01) |
| A01K 81/04 | (2006.01) |

(52) U.S. Cl.
CPC ............... F41B 7/04 (2013.01); A01K 81/04 (2013.01); F41B 3/02 (2013.01); F41G 1/35 (2013.01); F42B 6/08 (2013.01)

(58) Field of Classification Search
CPC ..................................... F41B 3/02; F41B 7/04
See application file for complete search history.

(56) References Cited

U.S. PATENT DOCUMENTS

| 181,891 | A | * | 9/1876 | Algec | |
| 3,401,938 | A | * | 9/1968 | Bear | F42B 6/08 |
| | | | | | 473/582 |
| 4,027,418 | A | | 6/1977 | Baldi et al. | |
| 4,573,445 | A | * | 3/1986 | Webb | F41B 3/02 |
| | | | | | 124/22 |
| 4,894,940 | A | | 1/1990 | Frain et al. | |
| 5,243,778 | A | | 9/1993 | Henley | |
| 6,641,493 | B1 | * | 11/2003 | Shifflett | F42B 6/04 |
| | | | | | 473/578 |
| 6,953,034 | B2 | | 10/2005 | May et al. | |
| 7,571,564 | B2 | | 8/2009 | Sullivan | |
| 9,220,246 | B1 | | 12/2015 | Roman | |
| 9,414,578 | B2 | | 8/2016 | Thornborough | |
| 2002/0026741 | A1 | | 3/2002 | Aguilar | |

* cited by examiner

*Primary Examiner* — John A Ricci

(57) ABSTRACT

A spear launching assembly includes a tube that is held in a hand and the tube is pointed toward game. A sling is removably coupled to the tube and the sling is comprised of a resiliently stretchable material. The sling is selectively drawn away from the second end of the tube to urge the sling into a shooting position. Moreover, the sling is releasable when the sling is urged into the shooting position thereby facilitating the sling to recoil toward the tube. A spear is slidable through the tube such that the spear is aimed at the game when the tube is pointed at the game. A lighting unit is coupled to the tube and the lighting unit is turned on to emit light outwardly from the tube wherein the lighting unit for illuminating the darkened environment and locating the spear when the spear has been launched. A plurality of arrow heads is provided and each of the arrow heads is removably coupled to the spear to pierce the game thereby facilitating the game to be killed.

15 Claims, 6 Drawing Sheets

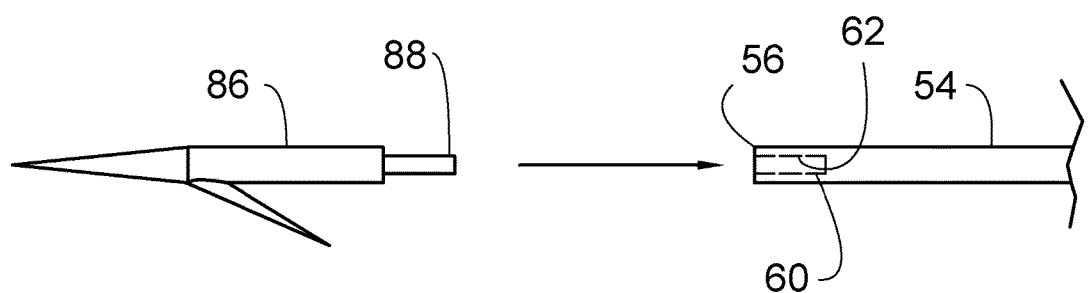
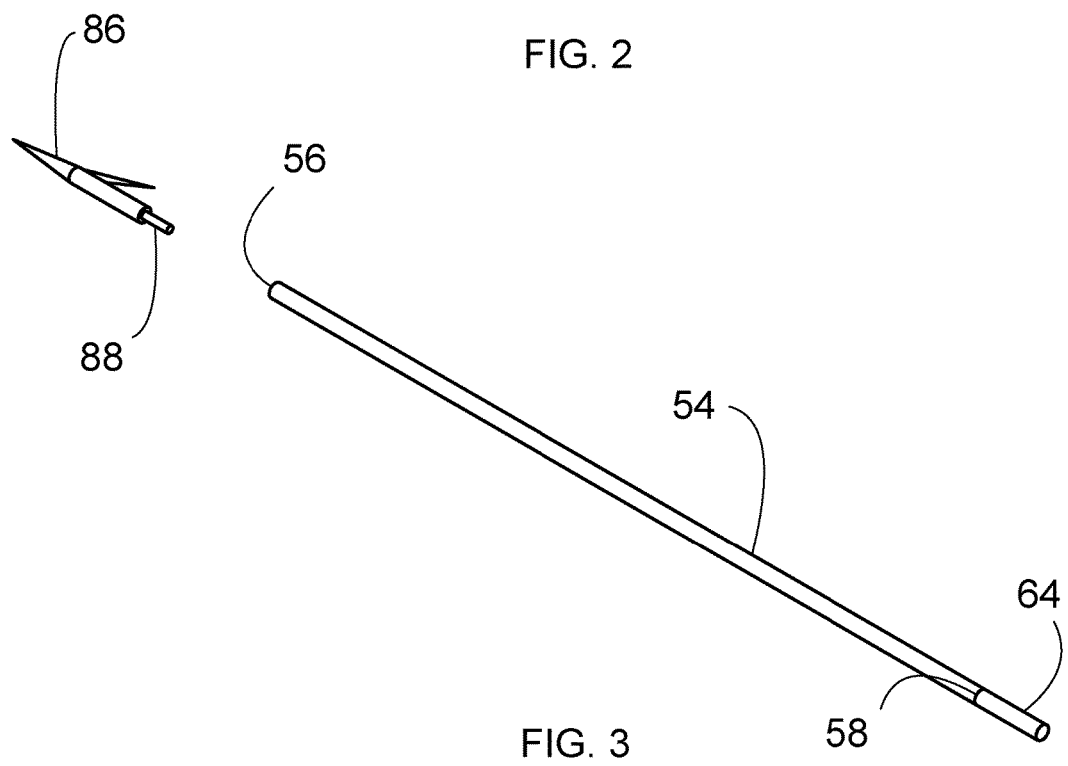
FIG. 2
FIG. 3

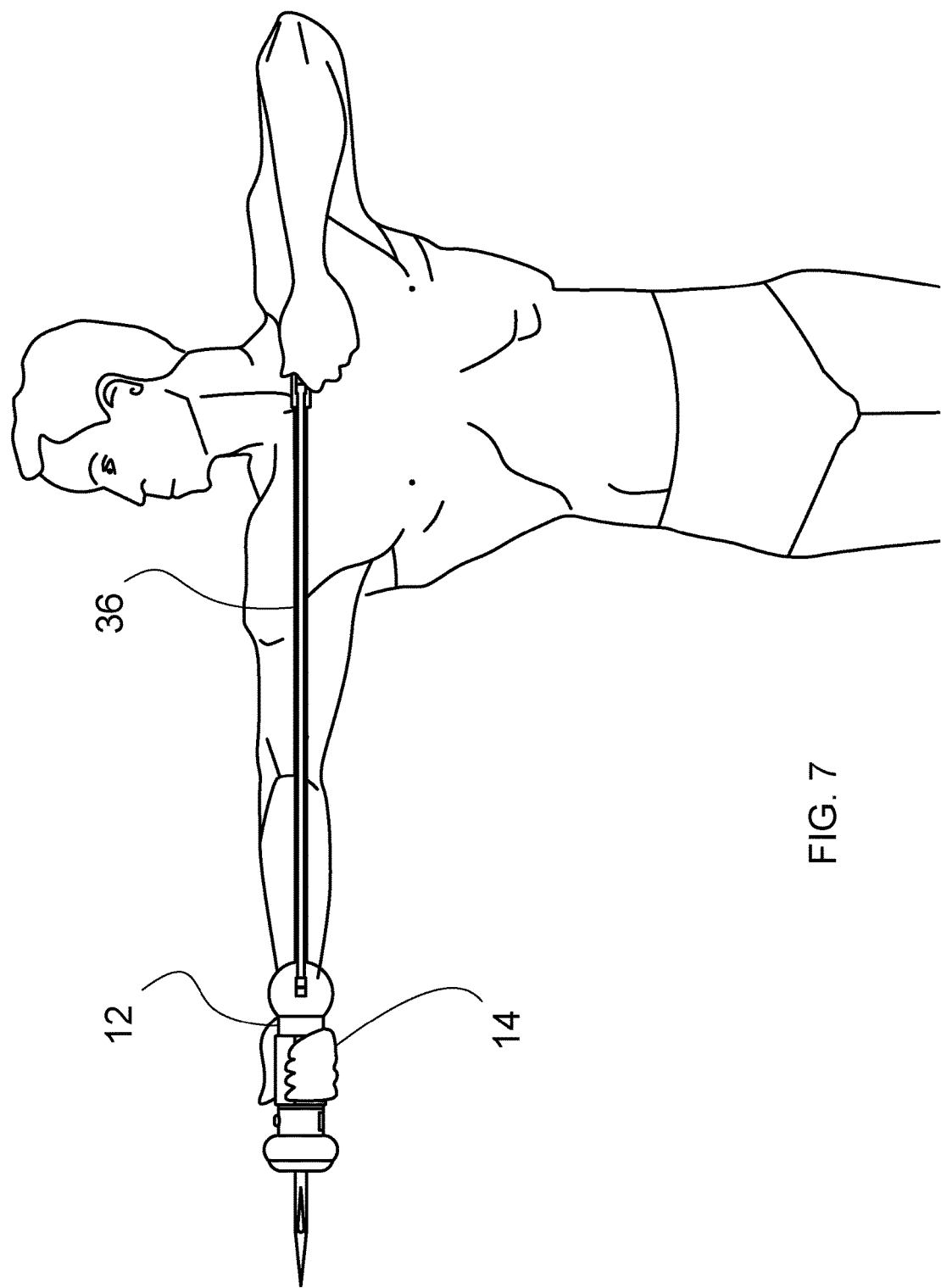

SPEAR LAUNCHING ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to launching devices and more particularly pertains to a new launching device for spear fishing.

BRIEF SUMMARY OF THE INVENTION

An embodiment of the disclosure meets the needs presented above by generally comprising a tube that is held in a hand and the tube is pointed toward game. A sling is removably coupled to the tube and the sling is comprised of a resiliently stretchable material. The sling is selectively drawn away from the second end of the tube to urge the sling into a shooting position. Moreover, the sling is releasable when the sling is urged into the shooting position thereby facilitating the sling to recoil toward the tube. A spear is slidable through the tube such that the spear is aimed at the game when the tube is pointed at the game. A lighting unit is coupled to the tube and the lighting unit is turned on to emit light outwardly from the tube wherein the lighting unit for illuminating the darkened environment and locating the spear when the spear has been launched. A plurality of arrow heads is provided and each of the arrow heads is removably coupled to the spear to pierce the game thereby facilitating the game to be killed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is an exploded perspective view a spear and an arrow head of an embodiment of the disclosure.

FIG. 3 is a perspective view of a spear and an arrow head of an embodiment of the disclosure.

FIG. 7 is a perspective in-use view of an embodiment of the disclosure.

DETAILED DESCRIPTION OF THE INVENTION

Figure 1:
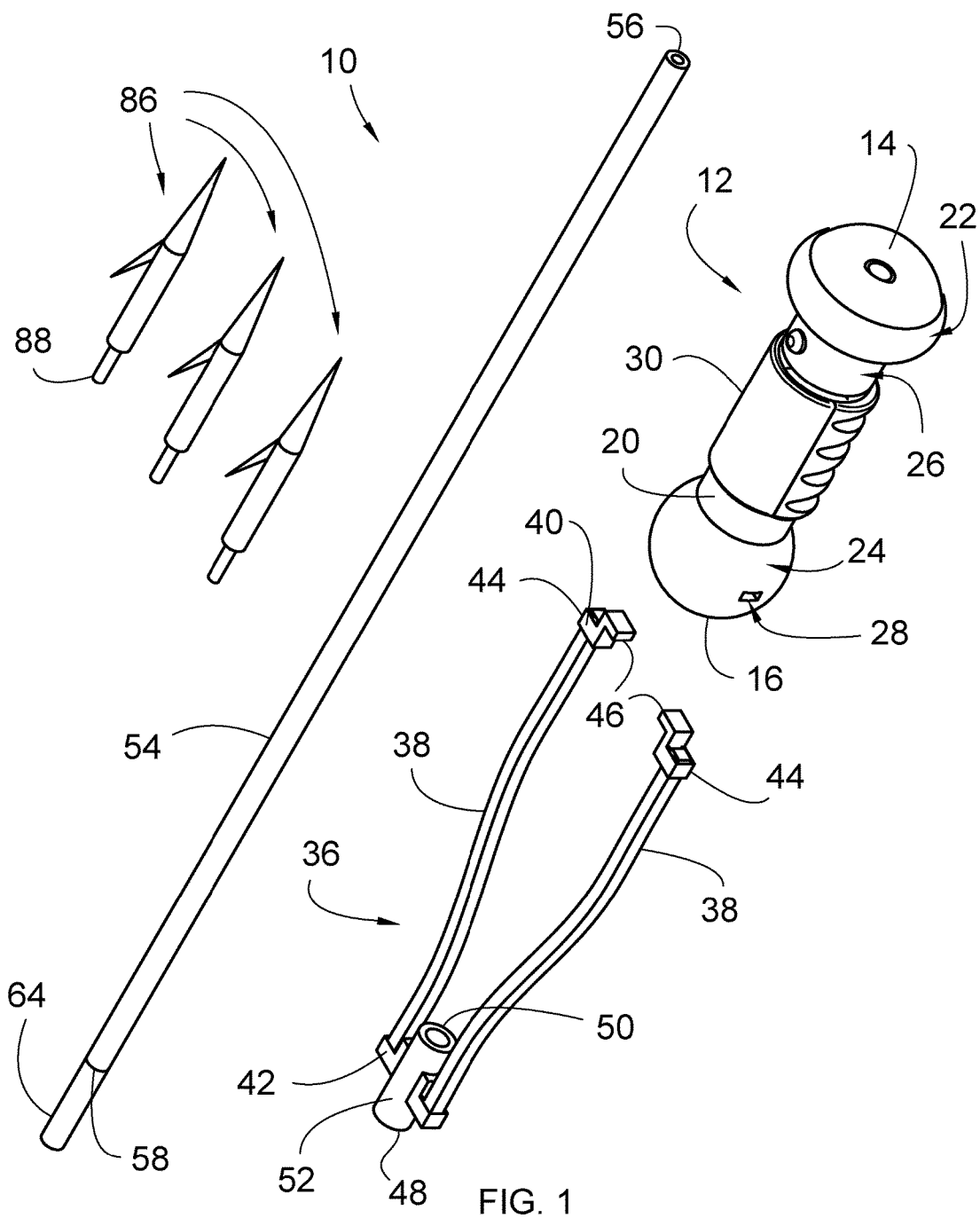
FIG. 1 is a perspective view of a spear launching assembly according to an embodiment of the disclosure.
Figure 4:
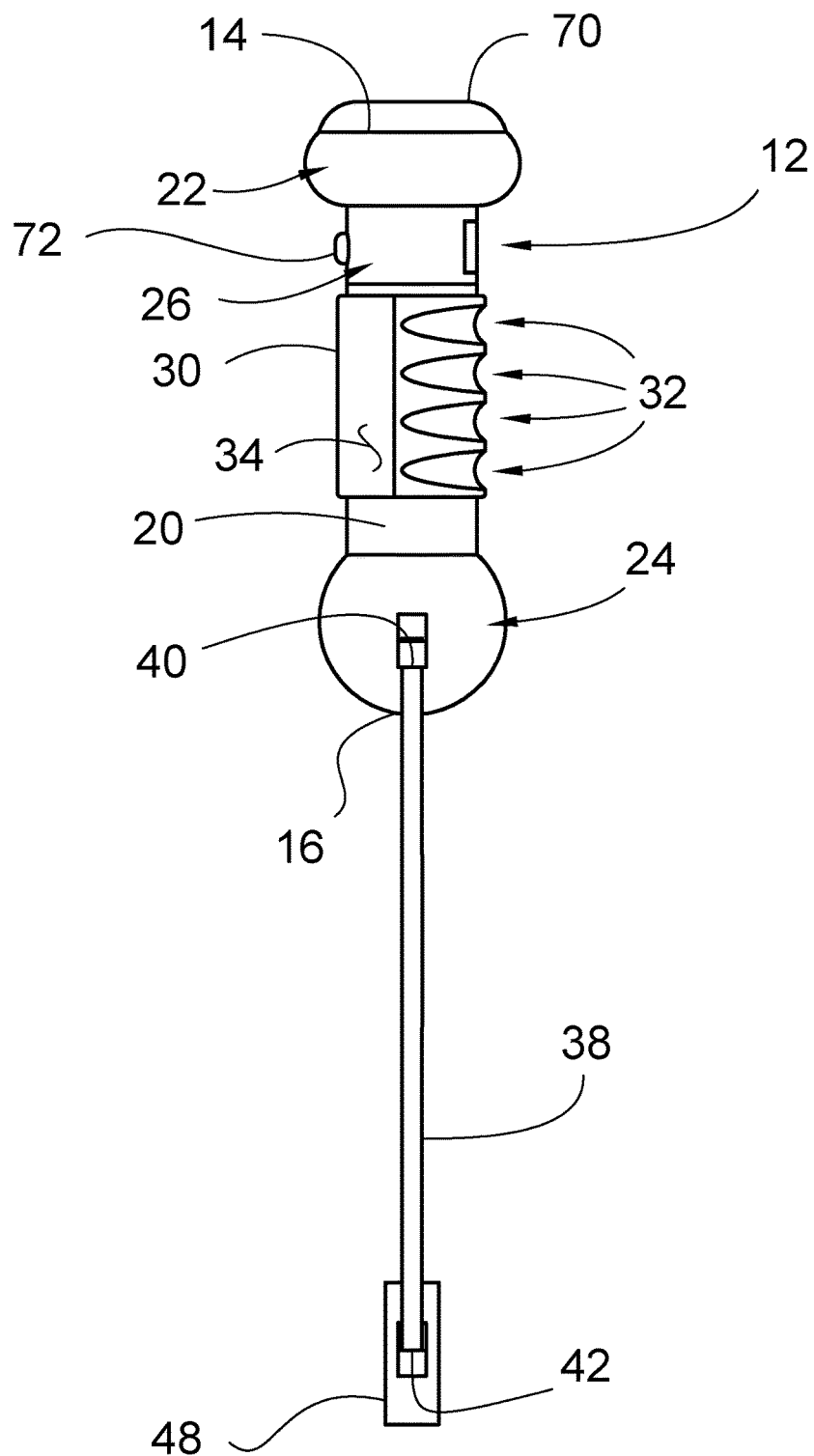
FIG. 4 is a right side view of a tube and a sling of an embodiment of the disclosure.
Figure 5:
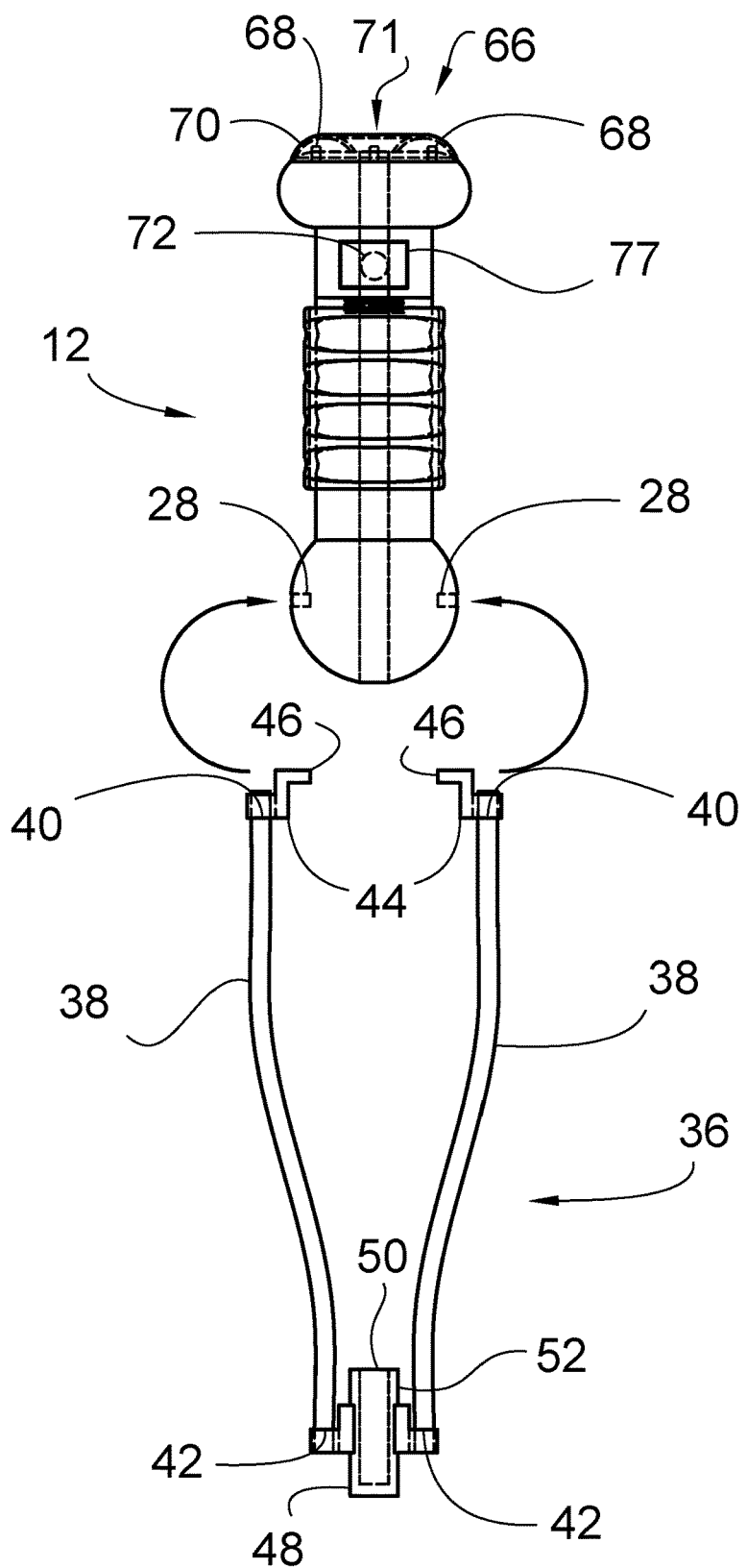
FIG. 5 is a top exploded view a tube and a sling of an embodiment of the disclosure.

With reference now to the drawings, and in particular to FIGS. 1 through 7 thereof, a new launching device embodying the principles and concepts of an embodiment of the disclosure and generally designated by the reference numeral 10 will be described.

As best illustrated in FIGS. 1 through 7, the spear launching assembly 10 generally comprises a tube 12 that can be held in a hand 14 and be pointed toward game. The game may be fish in a body of water, other forms sea life and any other living creature. The tube 12 has a first end 16, a second end 18 and an outer wall 20 extending therebetween. Additionally, the tube 12 may have a length ranging between approximately 13.0 cm and 18.0 cm.

The outer wall 20 curves outwardly adjacent to the first end 16 to define a first rounded portion 22 of the tube 12. Additionally, the outer wall 20 curves outwardly adjacent to the second end 18 to define a second rounded portion 24 of the tube 12 and a grip portion 26 of the tube 12 extending between the first 22 and second 24 rounded portions of the tube 12. The grip portion 26 is gripped and each of the first 22 and second 24 rounded portions inhibit the tube 12 from slipping out of the hand 14 when the tube 12 is gripped. The outer wall 20 of the second rounded portion 24 has a pair of wells 28 that each extend inwardly therein. The wells 28 are positioned on opposite sides of the second rounded portion 24 with respect to each other.

A grip 30 is positioned around the tube 12 and the grip has a plurality of finger indentations 32 therein for accommodating fingers on the hand 14. In this way the grip 30 enhances gripping the tube 12. The grip 30 is wrapped around the grip portion 26 of the tube 12 and the grip 30 has an outwardly facing surface 34. The outwardly facing surface 34 has each of the finger indentations 32 extending inwardly therein toward the tube 12. Moreover, each of the finger indentations 32 extends partially around a circumference of the grip 30. The grip 30 may be comprised of a resiliently compressible material such as foam rubber or the like.

A sling 36 is removably coupled to the tube 12 and the sling 36 is comprised of a resiliently stretchable material. The sling 36 is selectively drawn away from the second end 18 of the tube 12 to urge the sling 36 into a shooting position. Additionally, the sling 36 is releasable when the sling 36 is urged into the shooting position thereby facilitating the sling 36 to recoil toward the tube 12 in the convention of a sling-shot.

The sling 36 comprises a pair of bands 38 and each of the bands 38 is comprised of a resiliently stretchable material. Each of the bands 38 has a first end 40 and a second end 42, and a pair of retainers 44 is each coupled to the first end 40 of a respective one of the bands 38. Each of the retainers 44 includes a finger 46 that is oriented perpendicular to a line extending through the first 40 and second 42 ends of the respective band 38. The finger 46 on each of the retainers 44 is insertable into a respective one of the wells 28 in the second rounded portion 24 of the tube 12. In this way each of the bands 38 is releasably retained on the tube 12.

The sling 36 includes a cup 48 that has an open end 50 and an outer wall 52. The second end 18 of each of the bands 38 is coupled to the outer wall 52 of the cup 48 having the open end 50 of the cup 48 being directed toward each of the retainers 44. The outer wall 52 of the cup 48 is gripped to stretch each of the bands 38 away from the second end 18 of the tube 12 having the open end 50 of the cup 48 being directed toward the second end 18 of the tube 12.

A spear 54 is provided and the spear 54 is slidable through the tube 12 such that the spear 54 is aimed at the game when the tube 12 is pointed at the game. The spear 54 has a primary end 56 and a secondary end 58, and the primary end 56 has a well 60 extending toward the secondary end 58. The well 60 in the spear 54 has a bounding surface 62 and the bounding surface 62 is threaded. The open end 50 of the cup 48 insertably receives the secondary end 58 of the spear 54 when the spear 54 is extended through the tube 12.

Each of the bands 38 launches the spear 54 outwardly from the first end 16 of the tube 12 when the cup 48 is released after stretching the bands 38. In this way the spear 54 is launched at the game in the convention of a sling-shot. A reflector 64 is provided and the reflector 64 is coupled to the secondary end 58 of the spear 54. The reflector 64 is comprised of a light reflecting material to enhance locating the spear 54 in a darkened environment.

A lighting unit 66 is coupled to the tube 12 and the lighting unit 66 is turned on to emit light outwardly from the tube 12 for illuminating the darkened environment. The lighting unit 66 emits light to reflect from the reflector 64 thereby enhancing locating the spear 54 when the spear 54 has been launched. Thus, the reflector 64 and the lighting unit 66 facilitate the spear 54 to be located when the spear 54 is underwater after being launched.

The lighting unit 66 comprises a plurality of light emitters 68 and each of the light emitters 68 is coupled to the first end 16 of the tube 12. Each of the light emitters 68 may comprise an LED or the like. A lens 70 is coupled to the first end 16 of the tube 12 and the lens 70 covers each of the light emitters 68. The lens 70 is comprised of a translucent material to pass light therethrough and the lens 70 has an opening 71 extending therethrough that is aligned with an opening in the first end 16 of the tube 12.

Figure 6:
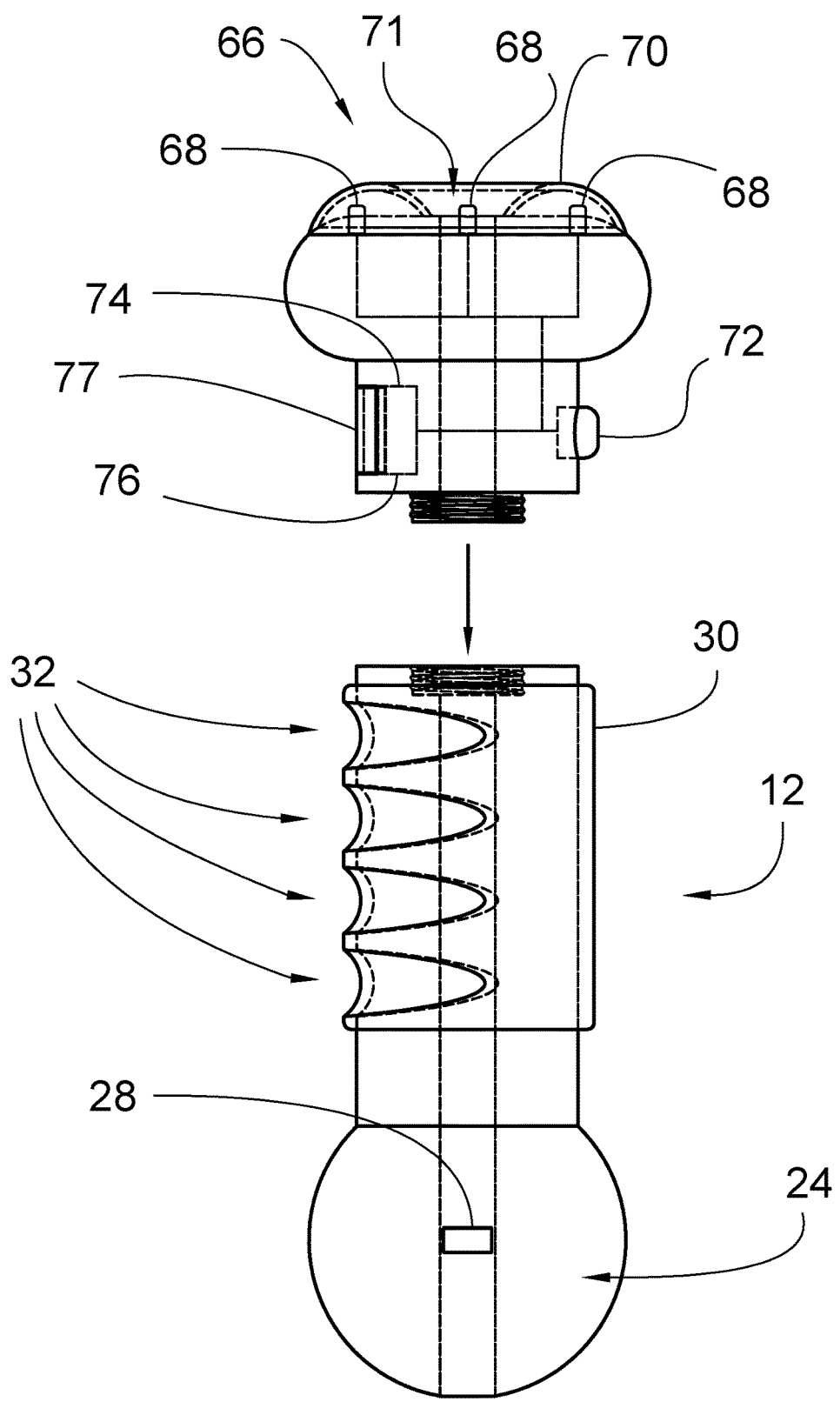
FIG. 6 is a phantom perspective view of a tube of an embodiment of the disclosure.

A button 72 is movably coupled to the tube 12 and the button 72 is electrically coupled to each of the light emitters 68 to turn each of the light emitters 68 on and off. A power supply 74 is positioned within the tube 12 and the power supply 74 is electrically coupled to the button 72. The power supply 74 comprises at least one battery 76 and a battery cover 77 is removably coupled to the outer wall 20 of the tube 12. The power supply is positioned beneath the battery cover 77. As shown in FIG. 6, the outer wall 20 of the tube 12 has a cut 78 therein to define a first half 80 of the tube 12 that is threadably coupled to a second half 82 of the tube 12. The power supply 74 is removably positioned within the second half 82 of the tube 12.

A plurality of arrow heads 86 is included and each of the arrow heads 86 is removably coupled to the spear 54 to pierce the game thereby facilitating the game to be killed. Each of the arrow heads 86 has a shaft 88 and the shaft 88 on each of the arrow heads 86 is threaded. Moreover, the shaft 88 on each of the arrow heads 86 threadably engages the bounding surface 62 of the well in the spear 54. Each of the arrow heads 86 has a unique size with respect to each other thereby facilitating each of the arrow heads 86 to be used for different sizes of game. Each of the arrow heads 86 may be spring loaded, spear 54 fishing arrow heads 86 of any conventional design that deploy a barb after striking the game.

In use, each of the retainers 44 is inserted into the respective well in the tube 12 to couple the sling 36 to the tube 12. The spear 54 is extended through the opening 71 in the lens 7 and the first end 14 of the tube 12, and the cup 48 is positioned on the secondary end 58 of the spear 54. The grip portion 26 of the tube 12 is gripped, the cup 48 is gripped, the cup 48 is drawn away from the tube 12 thereby stretching the bands 38 and the first end 16 of the tube 12 is pointed at the game. The cup 48 is released to launch the spear 54 at the game and strike the game. Additionally, the button 72 is manipulated to turn the light emitters 68 on for assisting locating the spear 54 when the spear 54 has been launched.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A spear launching assembly being configured to launch a spear at game for hunting, said assembly comprising:
    a tube being held in a hand having said tube being pointed toward game;
    a sling being removably coupled to said tube, said sling being comprised of a resiliently stretchable material, said sling being selectively drawn away from said second end of said tube to urge said sling into a shooting position, said sling being releasable when said sling is urged into said shooting position thereby facilitating said sling to recoil toward said tube;

a spear being slidable through said tube such that said spear is aimed at the game when said tube is pointed at the game;

a reflector being coupled to said secondary end of said spear, said reflector being comprised of a light reflecting material wherein said reflector is configured to enhance locating said spear in a darkened environment;

a lighting unit being coupled to said tube, said lighting unit being turned on to emit light outwardly from said tube wherein said lighting unit is configured to illuminate the darkened environment, said lighting unit emitting light to reflect from said reflector wherein said lighting unit is configured to enhance locating said spear when said spear has been launched;

a plurality of arrow heads, each of said arrow heads being removably coupled to said spear wherein each of said arrow heads is configured to pierce the game thereby facilitating the game to be killed; and wherein said tube has a first end, a second end and an outer wall extending therebetween, said outer wall curving outwardly adjacent to said first end to define a first rounded portion of said tube, said outer wall curving outwardly adjacent to said second end to define a second rounded portion of said tube and a grip portion of said tube extending between said first and second rounded portions of said tube, said grip portion being gripped wherein each of said first and second rounded portions are configured to inhibit said tube from slipping out of the hand.

2. The assembly according to claim 1, wherein said outer wall of said second rounded portion has a pair of wells each extending inwardly therein, said wells being positioned on opposite sides of said second rounded portion with respect to each other.

3. The assembly according to claim 2, wherein said sling comprises a pair of bands, each of said bands being comprised of a resiliently stretchable material, each of said bands having a first end and a second end.

4. The assembly according to claim 3, further comprising a pair of retainers, each of said retainers being coupled to said first end of a respective one of said bands, each of said retainers including a finger being oriented perpendicular to a line extending through said first and second ends of said respective band.

5. The assembly according to claim 4, wherein said finger on each of said retainers is insertable into a respective one of said wells in said second rounded portion of said tube such that each of said bands is releasably retained on said tube.

6. The assembly according to claim 4, further comprising a cup having an open end and an outer wall, said second end of each of said bands being coupled to said outer wall of said cup having said open end of said cup being directed toward each of said retainers, said outer wall of said cup being gripped to stretch each of said bands away from said second end of said tube having said open end of said cup being directed toward said second end of said tube.

7. The assembly according to claim 6, wherein said spear has a primary end and a secondary end, said primary end having a well extending toward said secondary end, said well in said spear having a bounding surface, said bounding surface being threaded.

8. The assembly according to claim 7, wherein said open end of said cup insertably receives said secondary end of said spear, each of said bands launching said spear outwardly from said first end of said tube when said cup is released after stretching said bands wherein said spear is configured to be launched at the game.

9. The assembly according to claim 7, wherein each of said arrow heads has a shaft, said shaft on each of said arrow heads being threaded, said shaft on each of said arrow heads threadably engaging said bounding surface of said well in said spear, each of said arrow heads having a unique size with respect to each other thereby facilitating each of said arrow heads to be used for different sizes of game.

10. The assembly according to claim 1, further comprising a grip being positioned around said tube, said grip having a plurality of finger indentations therein for accommodating fingers on the hand wherein said grip is configured to enhance gripping said tube, said grip being wrapped around said grip portion of said tube, said grip having an outwardly facing surface, said outwardly facing surface having each of said finger indentations extending inwardly therein toward said tube, each of said finger indentations extending partially around a circumference of said grip.

11. The assembly according to claim 1, wherein said lighting unit comprises a plurality of light emitters, each of said light emitters being coupled to said first end of said tube.

12. The assembly according to claim 11, further comprising a lens being coupled to said first end of said tube having said lens covering each of said light emitters, said lens being comprised of a translucent material wherein said lens is configured to pass light therethrough.

13. The assembly according to claim 12, further comprising a button being movably coupled to said tube, said button being electrically coupled to each of said light emitters to turn each of said light emitters on and off.

14. The assembly according to claim 13, further comprising a power supply being positioned within said tube, said power supply being electrically coupled to said button, said power supply comprising at least one battery.

15. A spear launching assembly being configured to launch a spear at game for hunting, said assembly comprising:

a tube being held in a hand having said tube being pointed toward game, said tube having a first end, a second end and an outer wall extending therebetween, said outer wall curving outwardly adjacent to said first end to define a first rounded portion of said tube, said outer wall curving outwardly adjacent to said second end to define a second rounded portion of said tube and a grip portion of said tube extending between said first and second rounded portions of said tube, said grip portion being gripped wherein each of said first and second rounded portions are configured to inhibit said tube from slipping out of the hand, said outer wall of said second rounded portion having a pair of wells each extending inwardly therein, said wells being positioned on opposite sides of said second rounded portion with respect to each other;

a grip being positioned around said tube, said grip having a plurality of finger indentations therein for accommodating fingers on the hand wherein said grip is configured to enhance gripping said tube, said grip being wrapped around said grip portion of said tube, said grip having an outwardly facing surface, said outwardly facing surface having each of said finger indentations extending inwardly therein toward said tube, each of said finger indentations extending partially around a circumference of said grip;

a sling being removably coupled to said tube, said sling being comprised of a resiliently stretchable material, said sling being selectively drawn away from said second end of said tube to urge said sling into a shooting position, said sling being releasable when said sling is urged into said shooting position thereby facilitating said sling to recoil toward said tube, said sling comprising:

a pair of bands, each of said bands being comprised of a resiliently stretchable material, each of said bands having a first end and a second end;

a pair of retainers, each of said retainers being coupled to said first end of a respective one of said bands, each of said retainers including a finger being oriented perpendicular to a line extending through said first and second ends of said respective band, said finger on each of said retainers being insertable into a respective one of said wells in said second rounded portion of said tube such that each of said bands is releasably retained on said tube; and a cup having an open end and an outer wall, said second end of each of said bands being coupled to said outer wall of said cup having said open end of said cup being directed toward each of said retainers, said outer wall of said cup being gripped to stretch each of said bands away from said second end of said tube having said open end of said cup being directed toward said second end of said tube;

a spear being slidable through said tube such that said spear is aimed at the game when said tube is pointed at the game, said spear having a primary end and a secondary end, said primary end having a well extending toward said secondary end, said well in said spear having a bounding surface, said bounding surface being threaded, said open end of said cup insertably receiving said secondary end of said spear, each of said bands launching said spear outwardly from said first end of said tube when said cup is released after stretching said bands wherein said spear is configured to be launched at the game;

a reflector being coupled to said secondary end of said spear, said reflector being comprised of a light reflecting material wherein said reflector is configured to enhance locating said spear in a darkened environment;

a lighting unit being coupled to said tube, said lighting unit being turned on to emit light outwardly from said tube wherein said lighting unit is configured to illuminate the darkened environment, said lighting unit emitting light to reflect from said reflector wherein said lighting unit is configured to enhance locating said spear when said spear has been launched, said lighting unit comprising:

a plurality of light emitters, each of said light emitters being coupled to said first end of said tube;

a lens being coupled to said first end of said tube having said lens covering each of said light emitters, said lens being comprised of a translucent material wherein said lens is configured to pass light therethrough;

a button being movably coupled to said tube, said button being electrically coupled to each of said light emitters to turn each of said light emitters on and off; and a power supply being positioned within said tube, said power supply being electrically coupled to said button, said power supply comprising at least one battery; and a plurality of arrow heads, each of said arrow heads being removably coupled to said spear wherein each of said arrow heads is configured to pierce the game thereby facilitating the game to be killed, each of said arrow heads having a shaft, said shaft on each of said arrow heads being threaded, said shaft on each of said arrow heads threadably engaging said bounding surface of said well in said spear, each of said arrow heads having a unique size with respect to each other thereby facilitating each of said arrow heads to be used for different sizes of game.

* * * * *